United States Patent [19]

Shay

[11] Patent Number: 4,595,080
[45] Date of Patent: Jun. 17, 1986

[54] LOW PRESSURE GREASE FITTING ADAPTED FOR REAR HUB BEARINGS

[76] Inventor: Robert W. Shay, 501 S. W. 2nd St., Hallandale, Fla. 33009

[21] Appl. No.: 669,331

[22] Filed: Nov. 2, 1984

[51] Int. Cl.$^4$ .............................................. F01M 11/04
[52] U.S. Cl. ..................................................... 184/105.3
[58] Field of Search ........... 184/105 R, 105 A, 105 B, 184/105 C, 105.3, 105.2, 105.1

[56] References Cited

U.S. PATENT DOCUMENTS

| | | | |
|---|---|---|---|
| Re. 20,743 | 5/1938 | Ehnts | 184/105 B |
| 2,086,071 | 7/1937 | Ehnts | 184/105.3 |
| 2,234,238 | 3/1941 | Forsberg | 184/105.3 |
| 2,566,354 | 9/1951 | Morey | 184/105.3 |
| 2,611,450 | 9/1952 | Kalikow | 137/879 X |
| 3,589,470 | 6/1971 | Dorn | 184/105.3 X |
| 3,949,837 | 4/1976 | Tremblay | 184/105.1 |
| 4,113,059 | 9/1978 | Markovski | 184/105.1 |

*Primary Examiner*—Leonard E. Smith
*Attorney, Agent, or Firm*—Harvey B. Jacobson

[57] ABSTRACT

An elongated cylindrical body is provided having a first end portion including an external surface of substantially circular cross section and slightly tapering in diameter toward the terminal end of the first body end portion. The body includes a second diametrically enlarged end portion and a grease passage extends longitudinally through the body and opens endwise outwardly through the axially ends of the first and second end portions. A grease fitting is secured in the end of the passage opening outwardly of the second body end portion and the tapering first end portion of the body is designed to be lightly wedgingly seated in the outer end of an access bore with a high pressure grease gun operatively coupled to the grease fitting for introducing grease into a cavity into which the inner end of the access bore opens. A build up of low pressure grease within the cavity is sufficient to force the tapered first end portion of the body from seated engagement in the outer end of the access bore and to thereby allow excess grease introduced into the cavity to escape therefrom via the access bore.

1 Claim, 4 Drawing Figures

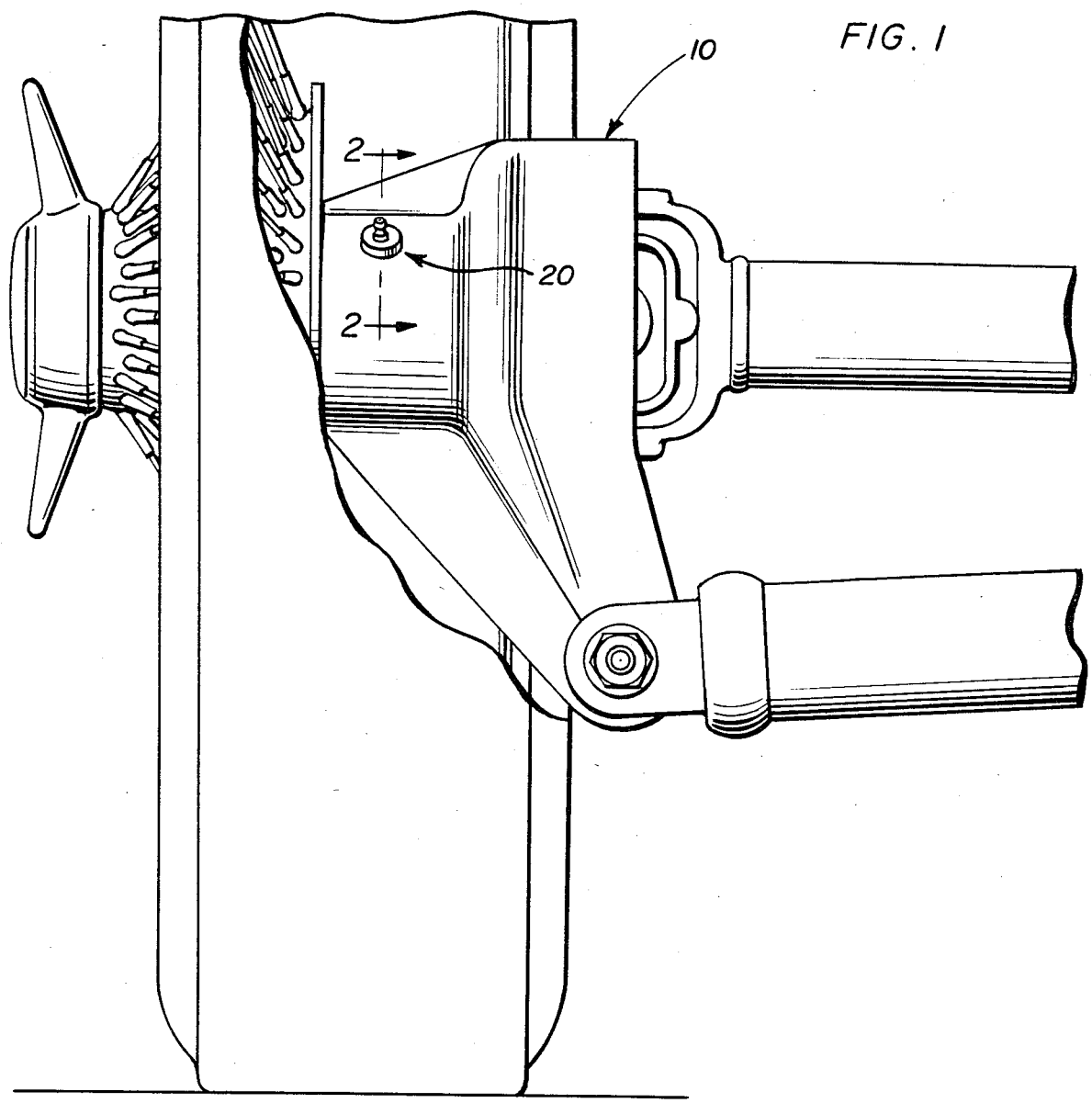
FIG. 1
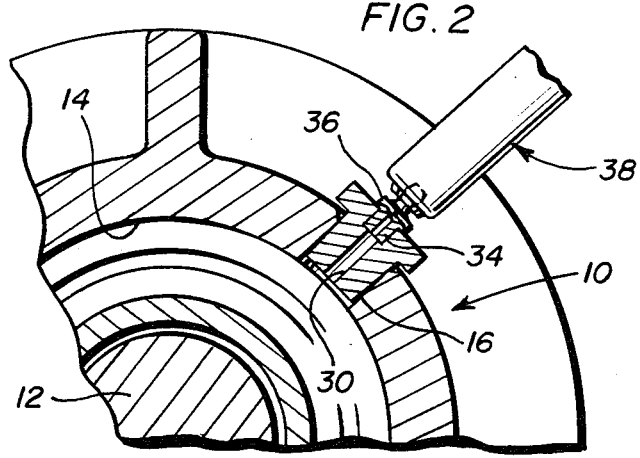
FIG. 2
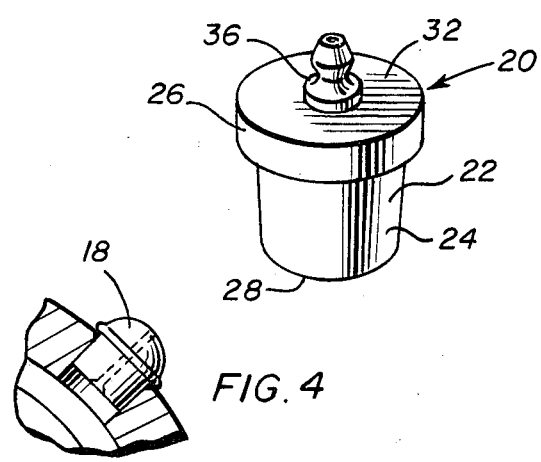
FIG. 3
FIG. 4

LOW PRESSURE GREASE FITTING ADAPTED FOR REAR HUB BEARINGS

BACKGROUND OF THE INVENTION

1. Field of the Invention

Some vehicles provided with independently sprung driving wheels include hub carriers through which the driving wheel supporting hub shafts are journalled. These hub shafts usually are journalled by inner and outer bearings supported in cavities within the associated hub carriers and disposed about the corresponding hub shafts. The hub carriers include bores opening thereinto by which lubrication grease may be added for greasing the bearings supported therein and the outer ends of the bores are closed by removable plugs.

However, inasmuch as the aforementioned bearings have grease seals equipped therewith which cannot withstand high pressures, a conventional high pressure grease gun may not be used for the purpose of admitting lubrication grease into the interior of the hub carrier through the aforementioned bore since excess grease pressures will "blow" the seals operatively associated with the bearings.

Accordingly, lubrication grease must be added to the interiors of the hub carriers by using special low pressure grease pumping means. This not only requires special low pressure grease pumping means but also consumes unnecessary time. Therefore, a need exists for means by which low grease pressure chambers such as those above described may have grease added thereto through an access bore by conventional high pressure grease guns in a manner preventing excess grease pressures from building up within the chambers.

2. Description of Related Art

Various different forms of lubricating fittings for use in special lubricating systems heretofore have been provided such as those disclosed in U.S. Pat. Nos. 2,234,238, 2,264,072, 2,515,611, 2,611,450 and 3,375,901. The lubricant fitting disclosed in U.S. Pat. No. 2,611,450 is of a type including means for relieving excess lubricant pressures and is functional to some degree in the desired manner. However, this pressure relieving lubricant fitting includes an external coiled band-type of pressure relief means subject to malfunction by an accumulation of dirt thereon or ice thereover.

Accordingly, a need exists for a substantially fail-safe means of lubricating a low pressure lubricant cavity through an access bore leading thereinto and in a manner which will prevent excess lubricant pressures from building up within the cavity, even though a high pressure lubricant gun is utilized to deliver lubricant to the cavity.

SUMMARY OF THE INVENTION

The low pressure grease fitting adapter of the instant invention includes an elongated cylindrical body having a first end portion including an external surface of substantially circular cross section and slightly tapering in diameter toward the terminal end of the first end portion. The body includes a grease passage extending longitudinally therethrough and having opposite ends opening endwise outwardly of the terminal ends of the first and second end portions of the body. The end of the passage opening through the terminal end of the second end portion of the body has a conventional endwise outwardly facing grease fitting secured therein. The first end portion of the body is designed to be partially telescoped and lightly wedgingly seated in the outer end of a bore opening into an interior housing cavity in which grease is to be supplied under low pressure and a high pressure grease gun may be coupled to the grease fitting for forcing grease therethrough and into the cavity. However, when the interior of the cavity is filled with grease minimal interior grease pressure is sufficient to force the tapered end portion of the body outwardly of the outer end of the bore and to thereby relieve excess grease pressures even though a high pressure grease gun is coupled to an utilized to force high pressure grease through the aforementioned grease fitting.

The main object of this invention is to provide a grease fitting adapter enabling grease to be supplied to an internal cavity through an access bore opening into the cavity while utilizing a high pressure grease gun to admit grease into the access bore.

Another object of this invention is to provide a low pressure grease fitting adapter which may be used in conjunction with access bores of different diameters.

Still another important object of this invention is to provide a low pressure grease fitting adapter which may be used in conjunction with different grades of grease.

A final object of this invention to be specifically enumerated herein is to provide a low pressure grease fitting adapter in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is an elevational view of a typical independently sprung drive wheel hub carrier with the low pressure grease fitting adapter of the instant invention operatively associated therewith;

FIG. 2 is an enlarged fragmentary vertical sectional view taken substantially upon the plane indicated by the section line 2—2 of FIG. 1;

FIG. 3 is a perspective view of the grease fitting adapter; and

FIG. 4 is a fragmentary sectional view similar to FIG. 2 and illustrating the access bore for the internal cavity of the hub carrier closed at its outer end by a conventional closure cap.

DESCRIPTION OF THE PREFERRED EMBODIMENT

Referring now more specifically to the drawings, the numeral 10 generally designates a typical rear driving wheel independently sprung hub carrier housing through which a driven hub shaft is journalled. The housing 10 defines an interior cavity 14 through which the shaft 12 is journalled and in which inner and outer bearings (not shown) are received for journalling the shaft 12 from the housing 10. The bearings are provided with low pressure grease seals (not shown) and accordingly, when lubricating grease is added to the cavity 14 for lubricating the bearings such grease must not be added to the cavity under high pressure.

The housing 10 includes an access bore 16 formed therein through which lubricating grease under low pressure may be added to the cavity 14 and the outer end of the bore 16 is closed by a friction fitted removable cap 18 at all times when grease is not being added to the cavity 14 through the bore 16.

Conventionally, when it is desired to add grease to the cavity 14, the cap 18 is removed and a low pressure lubricating grease dispensing means (not shown) is utilized to admit lubricating grease into the cavity 14 through the bore 16. However, the operation of adding grease to the cavity 14 can be greatly accelerated if a high pressure lubricating gun is used and the need for a low pressure grease dispensing means is eliminated. On the other hand, the introduction of grease under pressure through a conventional grease fitting secured in the outer end of the bore 16 will often result in excess grease pressures building up within the cavity 14 to the extent that the grease seals associated with the aforementioned bearings are "blown".

The low pressure grease fitting adapter of the instant invention is referred to in general by the reference numeral 20 and may be used in conjunction with a high pressure grease gun for the purpose of admitting lubricating grease into the cavity 14 without excessive grease pressure within the cavity 14.

The adapter 20 includes an elongated cylindrical body 22 having first and second end portions 24 and 26. The end portion 24 is substantially circular in cross section and is slightly tapered in diameter toward the terminal end 28 of the first end portion 24. The second end portion 26 comprises a diametrically enlarged cylindrical end portion defining an annular shoulder facing outwardly of the end 28 and the body 22 has a central longitudinal bore 30 formed therethrough. One end of the bore 30 opens through the terminal end 28 and the other end of the bore 30 opens through the terminal end 32 of the second end portion 26 and is equipped with an inwardly tapering threaded counterbore 34 in which a conventional straight Zerk grease fitting 36 is threadedly engaged.

The minor and major diameter end portions of the first end portion 24 are smaller and greater, respectively, in diameter than the access bore 16. Accordingly, the body 22 may have its first end portion 24 telescoped and lightly and wedgingly seated in the outer end of the access bore 16 in the manner illustrated in FIG. 2 of the drawings after the cap 18 has been removed. Then, a conventional high pressure grease gun 38 has it outlet fitting removably coupled with the grease fitting 36 in order to introduce lubricating grease under high pressure through the grease fitting 36 and the bore 30 into the cavity 14. When the cavity 14 becomes filled with grease and as soon as the internal pressure of grease within the cavity 14 begins to build up, minimal pressure of grease acting upon the inner end of the body 22 forces the latter out of seated engagement within the outer end of the access bore 16 and thus allows excess grease build up within the cavity 14 to escape therefrom through the bore 16 and about the body 22 beneath the diametrically enlarged second end portion 26 of the adapter 20. The access bore is approximately ⅜-inch in diameter and thereby represents a cross sectional area of approximately 0.44 square inch. Accordingly, a build up of grease pressure within the cavity 14 of approximately 20 PSI will exert slightly less than a 10-lb. outward push on the adapter 20 to prevent a further build up of grease pressure within the cavity 14.

It may therefore be seen that the adapter 20 may be used in conjunction with a high pressure grease gun to supply high pressure grease to a closed cavity without excess grease pressure build up being experienced within the cavity.

Various materials may be used in the construction of the adapter 20, although it is preferable to utilized a suitable metal or high strength plastic in view of the threaded connection between the body 22 and the grease fitting 36. Further, the body 22 may, of course, be made in different diameters in order that the invention may be used in conjunction with different size access bores.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. The method of at least substantially filling an interior cavity with a lubrication fluid to a predetermined low pressure and through an access bore opening into said cavity by the utilization of a high pressure grease gun, said method including providing an elongated body having first and second end portions and provided with a longitudinal bore formed therethrough with said first end portion being generally circular in cross sectional shape and tapering in diameter toward the free end thereof and said second end portion being diametrically enlarged and the opposite ends of said bore opening endwise outwardly of said first and second end portions and having an endwise outwardly facing grease fitting secured to the end of said bore opening outwardly of said second body end portion, lightly wedgedly seating said first end portion in the outer end of said access bore to define a low pressure fluid seal between said body and the outer end of said access bore, operatively engaging the discharge fitting of a high pressure grease gun with said grease fitting and then actuating said high pressure grease gun to supply grease under high pressure to said grease fitting while applying light yieldable manual thrust pressure to said body, through said grease gun in a direction extending longitudinally of said body to maintain said first end portion seated in said access bore against fluid pressure therein only to said predetermined pressure, and terminating operation of said grease gun as soon as the pressure within said access bore acting upon said first end portion of said body is sufficient to overcome said thrust pressure and initially outwardly displace said one end portion from seated engagement in said access bore.

* * * * *